(12) United States Patent
Gao et al.

(10) Patent No.: US 12,231,344 B2
(45) Date of Patent: Feb. 18, 2025

(54) DATA TRANSMISSION METHOD, ELECTRONIC DEVICE, AND STORAGE MEDIUM

(71) Applicant: ZTE CORPORATION, Shenzhen (CN)

(72) Inventors: Chenqiang Gao, Shenzhen (CN); Jinghai Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 74 days.

(21) Appl. No.: 18/257,924

(22) PCT Filed: Sep. 15, 2021

(86) PCT No.: PCT/CN2021/118536
§ 371 (c)(1),
(2) Date: Jun. 16, 2023

(87) PCT Pub. No.: WO2022/134671
PCT Pub. Date: Jun. 30, 2022

(65) Prior Publication Data
US 2024/0048498 A1 Feb. 8, 2024

(30) Foreign Application Priority Data

Dec. 24, 2020 (CN) .......................... 202011550526.9

(51) Int. Cl.
*H04L 12/24* (2006.01)
*H04L 41/0803* (2022.01)
(Continued)

(52) U.S. Cl.
CPC ............ *H04L 47/283* (2013.01); *H04L 47/56* (2013.01)

(58) Field of Classification Search
CPC ........ H04L 47/283; H04L 47/56; H04L 47/28
(Continued)

(56) References Cited

U.S. PATENT DOCUMENTS

2011/0320570 A1* 12/2011 Ewing ................... H04L 67/025
709/230
2012/0030688 A1* 2/2012 Zimmermann ...... G06Q 10/109
719/313
(Continued)

FOREIGN PATENT DOCUMENTS

| CN | 110545241 A | 12/2019 |
|---|---|---|
| CN | 110868363 A | 3/2020 |

(Continued)

OTHER PUBLICATIONS

International Searching Authority. International Search Report and Written Opinion for PCT Application No. PCT/CN2021/118536 and English translation, mailed Dec. 2, 2021, pp. 1-11.

*Primary Examiner* — Yves Dalencourt
*Assistant Examiner* — Elizabeth Kassa
(74) *Attorney, Agent, or Firm* — Vivacqua Crane, PLLC

(57) ABSTRACT

Disclosed are a data transmission method, an electronic device, and a storage medium. The data transmission method may include: receiving a message sent by an upstream device, wherein the message carries first information for indicating an outbound interface and second information for indicating a period value; acquiring a reception sub-period label according to a time of arrival of the message and the second information, wherein the reception sub-period label is used for indicating a sequential position of a reception sub-period used when the message is received in an entire reception period, and the reception period
(Continued)

Receive a message sent by an upstream device, where the message carries first information for indicating an outbound interface and second information for indicating a period value ⎯ 101

Acquire a reception sub-period label according to a time of arrival of the message and the second information ⎯ 102

Send the message according to the reception sub-period label and the first information ⎯ 103 comprises a plurality of reception sub-periods; and sending the message according to the reception sub-period label and the first information.

20 Claims, 7 Drawing Sheets

(51) Int. Cl.
*H04L 47/283* (2022.01)
*H04L 47/56* (2022.01)

(58) Field of Classification Search
USPC .......................................................... 709/238
See application file for complete search history.

(56) References Cited

U.S. PATENT DOCUMENTS

| | | | |
|---|---|---|---|
| 2014/0177653 A1* | 6/2014 | Tzeng | H04J 3/0635 370/503 |
| 2016/0182215 A1 | 6/2016 | Valenza et al. | |
| 2017/0155940 A1* | 6/2017 | Jin | H04N 21/4532 |
| 2018/0270188 A1* | 9/2018 | Kodaypak | H04L 63/0428 |
| 2019/0069257 A1* | 2/2019 | Iwakiri | G07C 5/008 |
| 2019/0394140 A1* | 12/2019 | Akl-Chedid | H04L 47/245 |
| 2020/0287967 A1* | 9/2020 | Gafni | H04L 69/22 |
| 2021/0083970 A1 | 3/2021 | Liu et al. | |
| 2021/0184781 A1 | 6/2021 | Meng et al. | |
| 2023/0254263 A1* | 8/2023 | Wang | H04L 47/562 370/412 |

FOREIGN PATENT DOCUMENTS

| | | | |
|---|---|---|---|
| CN | 111404840 A | 7/2020 | |
| WO | WO-2014194749 A1 * | 12/2014 | H04L 12/6418 |

* cited by examiner

DATA TRANSMISSION METHOD, ELECTRONIC DEVICE, AND STORAGE MEDIUM

CROSS-REFERENCE TO RELATED APPLICATION

This application is a national stage filing under 35 U.S.C. § 371 of international application number PCT/CN2021/118536, filed Sep. 15, 2021, which claims priority to Chinese patent application No. 202011550526.9, filed Dec. 24, 2020. The contents of these applications are incorporated herein by reference in their entirety.

TECHNICAL FIELD

Embodiments of the present disclosure relate to the field of communication, and more particularly, to a data transmission method, an electronic device, and a storage medium.

BACKGROUND

Deterministic Networking (DetNet) is a technology of providing deterministic service guarantee capabilities to services borne in a network domain. These deterministic service guarantee capabilities include delay, delay jitter, packet loss rate, and other indicators. To ensure a delay jitter in an end-to-end transmission of a message in an asynchronous mode, a source device needs to add time period label information of an upstream device in the message, so that a forwarding device, after receiving the message, can find forwarding sub-period label information of an outbound interface in a fixed mapping relationship table of inbound interface labels and outbound interface labels according to the time period label information of the upstream device carried in the message and an outbound interface number determined according to address information carried in the message. Then, the forwarding device replaces original time label information in the message with the forwarding sub-period label information to generate a new message, and finally forwards the new message through the corresponding outbound interface according to a forwarding sub-period indicated by the forwarding sub-period label information.

However, an original message in a protocol does not contain time period label information, and the protocol needs to be extended in order to add time period label information in the message. In addition, the message needs to be modified to replace the time label information in the original message with forwarding sub-period label information, making the operations more complicated and more resource-consuming.

SUMMARY

An embodiment of the present disclosure provides a data transmission method. The method includes the following steps: receiving a message sent by an upstream device, the message carries first information for indicating an outbound interface and second information for indicating a period value; acquiring a reception sub-period label according to a time of arrival of the message and the second information; and sending the message according to the reception sub-period label and the first information.

An embodiment of the present disclosure further provides an electronic device. The electronic device includes: at least one processor; and a memory communicably connected to the at least one processor, the memory stores instructions executable by the at least one processor which, when executed by the at least one processor, causes the at least one processor to implement the above data transmission method.

An embodiment of the present disclosure further provides a computer-readable storage medium, storing a computer program which, when executed by a processor, causes the processor to implement the above data transmission method.

DETAILED DESCRIPTION

A main objective of embodiments of the present disclosure is to provide a data transmission method, an electronic device, and a storage medium, to implement data transmission in an asynchronous mode without extending a protocol or modifying a message.

Figure 1:
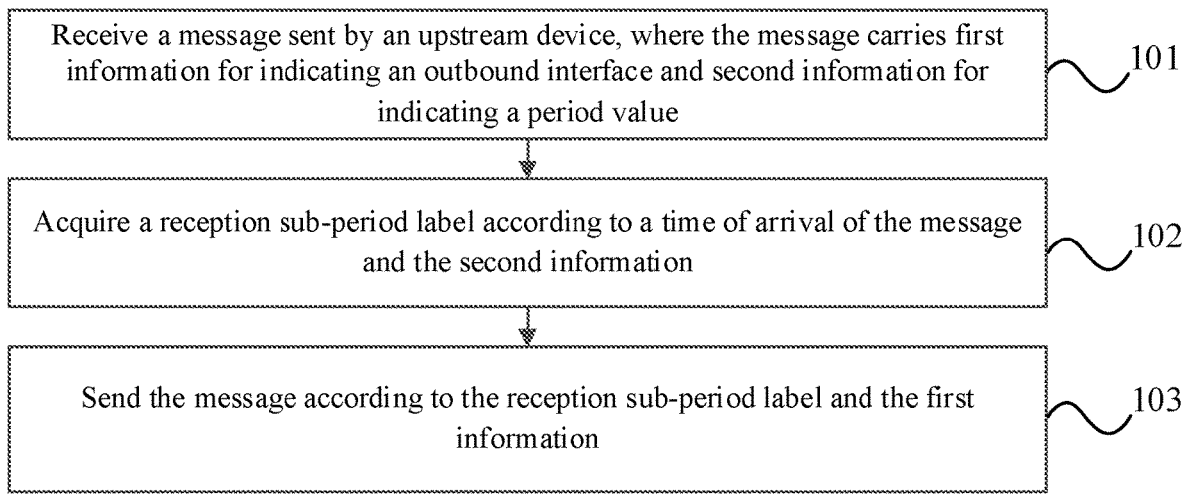
FIG. 1 is a flowchart of a data transmission method according to a first embodiment of the present disclosure.

A first embodiment of the present disclosure relates to a data transmission method applied to a forwarding device. As shown in FIG. 1, the method includes the following steps of S101, S102 and S103.

At S101, a message sent by an upstream device is received, where the message carries first information for indicating an outbound interface and second information for indicating a period value.

In this embodiment, the upstream device may be a source device sending the message or may be another forwarding device in a forwarding process. The first information includes a destination IP address, a MAC address, etc. The second information includes a stream identification number, a priority, a 6-tuple of a data packet, etc. Elements in the 6-tuple of the data packet may include a source IP address, a destination IP address, a protocol number, a source port, a destination port, a service type, an interface index, etc. The 6-tuple is a tuple formed by six elements selected from the above elements according to an actual situation. Certainly, the above is only an example. In practice, the first information may further include information included in other protocol-specified messages that can be used to indicate the outbound interface, and the second information may further include information included in other protocol-specified messages that can be used to indicate the period value, which will not be elaborated herein.

At S102, a reception sub-period label is acquired according to a time of arrival of the message and the second information.

Figure 2:
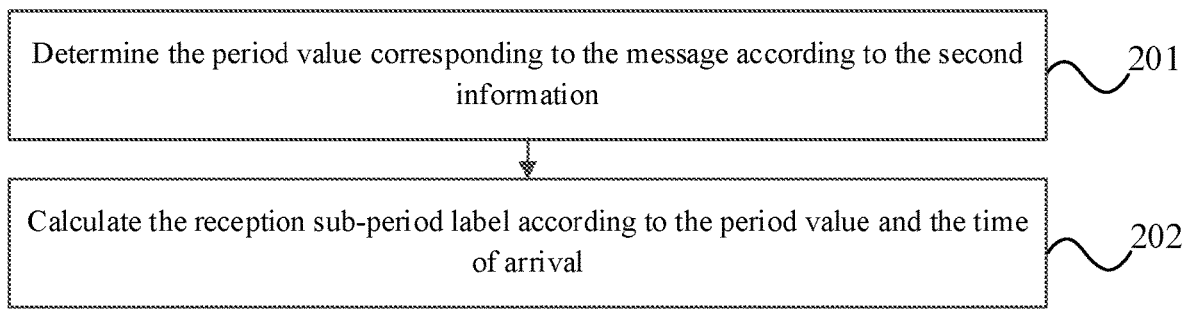
FIG. 2 is a flowchart of step S102 in the data transmission method according to the first embodiment of the present disclosure shown in FIG. 1.

In an embodiment, as shown in FIG. 2, S102 includes the following steps of S201 and S202.

At S201, the period value corresponding to the message is determined according to the second information.

At S202, the reception sub-period label is calculated according to the period value and the time of arrival.

In this embodiment, the reception sub-period label is calculated using the following formula:

$$x = \left\{ \left[ \frac{t_{arrive} - t_{start}}{T_n} \right] + 1 \right\} \% \, m_n,$$

where $T_n$ denotes the period value obtained by executing S201; x denotes the reception sub-period label and indicates a sequential position of a reception sub-period used when the message is received in an entire reception period, and the reception period includes a plurality of reception sub-periods; $t_{start}$ denotes a preset value, which may be a moment corresponding to a local clock when the device is started; $t_{arrive}$ denotes the time of arrival; $m_n$ denotes a quantity of reception sub-periods included in the reception period determined according to $T_n$; [ ] in the formula denotes a rounding sign; and % denotes a remainder sign.

At S103, the message is sent according to the reception sub-period label and the first information.

In this embodiment, first, a forwarding sub-period label may need to be determined according to the reception sub-period label, then a forwarding sub-period is determined according to the forwarding sub-period label, and finally in the forwarding sub-period, the message is sent out from the outbound interface determined according to the first information.

In the embodiment of the present disclosure, after a message without adding time period label information of the upstream device is received from the upstream device, a reception sub-period label is acquired according to a time of arrival of the message and second information used for indicating a period value and carried in the message, and finally the message is directly sent out according to the reception sub-period label and first information used for indicating an outbound interface and carried in the message. Because time label information of the upstream device is not carried in the message, only the second information in the message and the time of arrival of the message may need to be extracted to calculate a reception sub-period of a current device to replace the time label information of the upstream device. Further, there may be no need to update the time label information due to a change of the upstream device before forwarding the time label information to a downstream device, so that data transmission can be implemented in an asynchronous mode without extending a protocol or modifying the message.

Figure 3:
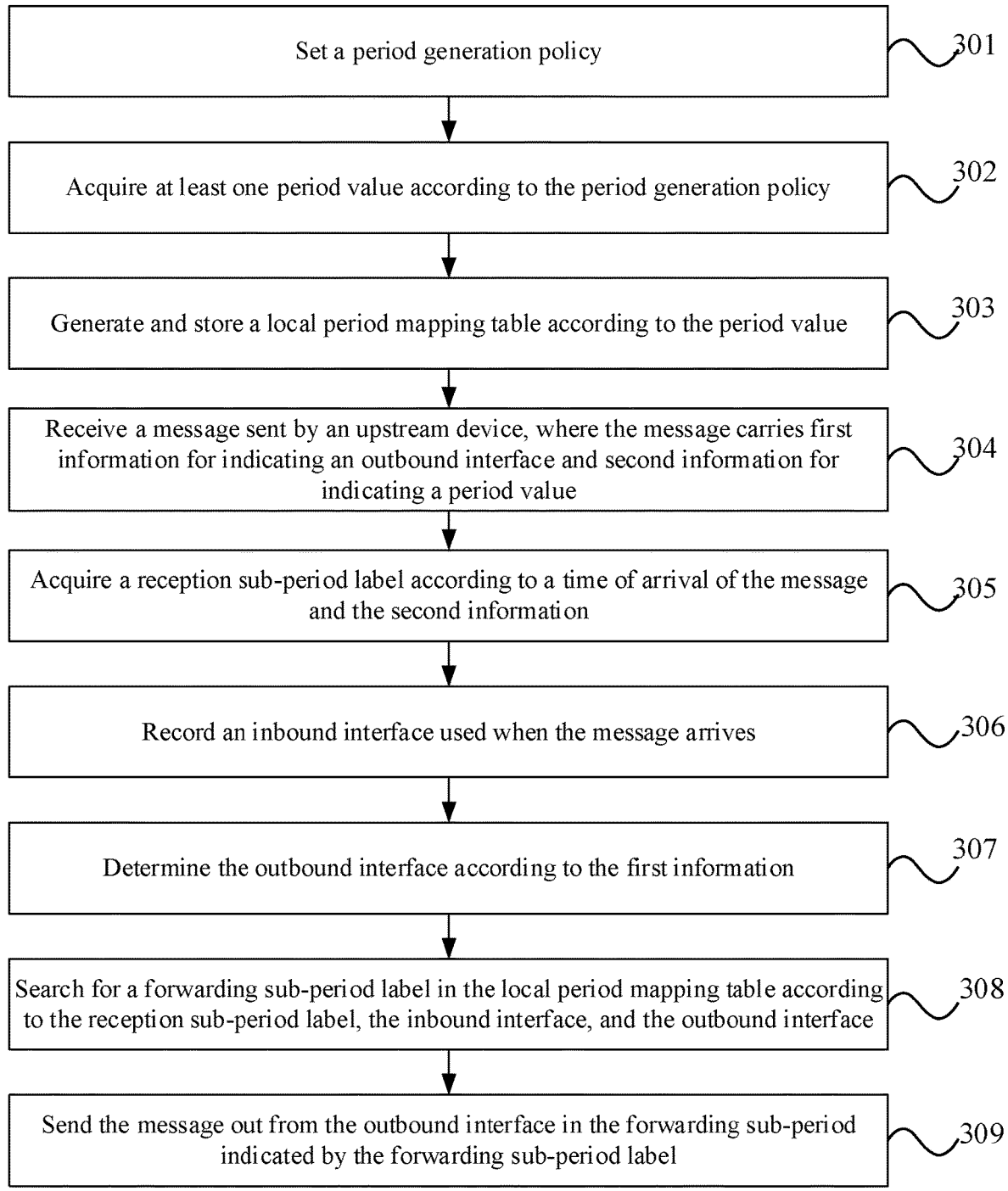
FIG. 3 is a flowchart of a data transmission method according to a second embodiment of the present disclosure.

A second embodiment of the present disclosure relates to a data transmission method. This embodiment is substantially the same as the first embodiment, except that a local period mapping table may need to be generated. As shown in FIG. 3, the method includes the following steps of S301, S302, S303, S304, S305, S306, S307, S308 and S309.

At S301, a period generation policy is set.

In this embodiment, the period generation policy is to acquire a period value according to second information. Because the second information may be a stream identification number, a 6-tuple of a data packet, a priority, etc., the period generation policy may be to acquire a period value according to the stream identification number, acquire a period value according to the 6-tuple of the packet, acquire a period value according to the priority, etc. Certainly, the above is only an example. In practice, the period generation policy may further include other information, which will not be elaborated herein.

At S302, at least one period value is acquired according to the period generation policy.

At S303, a local period mapping table is generated according to the period value and stored.

At S304, a message sent by an upstream device is received, where the message carries first information for indicating an outbound interface and second information for indicating a period value.

S304 in this embodiment is substantially the same as S101 in the first embodiment, so the details will not be elaborated herein.

It should be noted that the second information in S304 may need to be consistent with the second information used in the period generation policy in S301. If the period generation policy is to acquire the period value according to the stream identification number, the stream identification number carried in the message may need to be extracted as the second information in S304.

At S305, a reception sub-period label is acquired according to a time of arrival of the message and the second information.

S305 in this embodiment is substantially the same as S102 in the first embodiment, so the details will not be elaborated herein.

At S306, an inbound interface used when the message arrives is recorded.

At S307, the outbound interface is determined according to the first information.

At S308, a forwarding sub-period label is searched for in the local period mapping table according to the reception sub-period label, the inbound interface, and the outbound interface.

At S309, the message is sent out from the outbound interface in the forwarding sub-period indicated by the forwarding sub-period label.

It should be noted that the above steps S306 to S309 are a detailed implementation of S103 in the first embodiment.

In this embodiment, on the basis of setting the period generation policy, because one or more period values can be generated according to the set period generation policy, more than one period value can be used accordingly, such that mapping and forwarding in a multi-period scenario can be supported.

Figure 4:
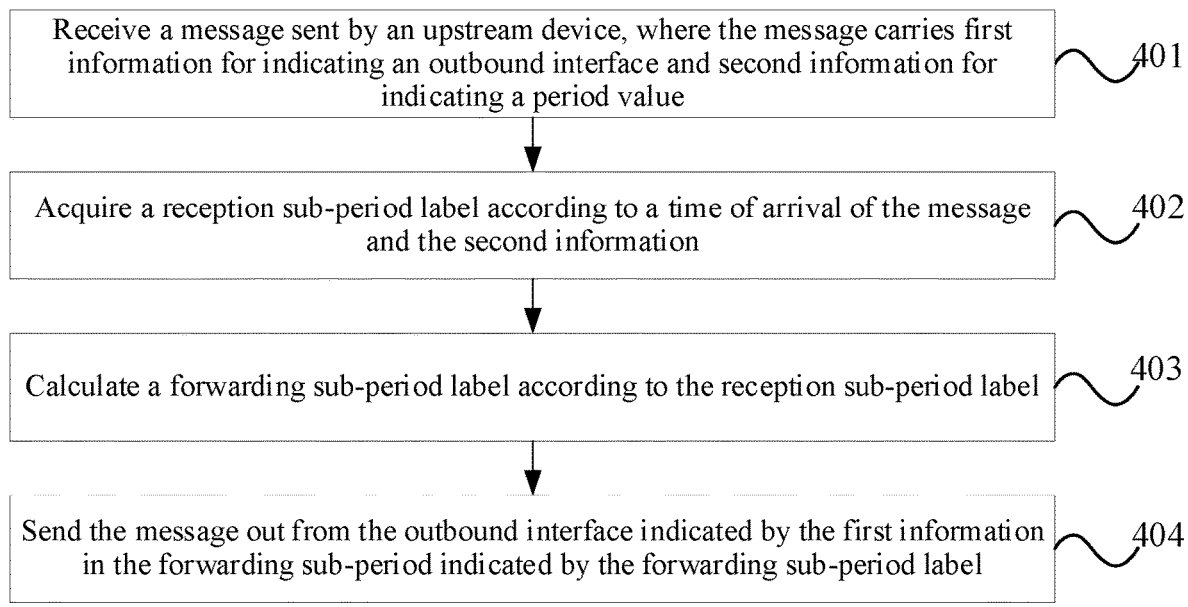
FIG. 4 is a flowchart of a data transmission method according to a third embodiment of the present disclosure.

A third embodiment of the present disclosure relates to a data transmission method. This embodiment is substantially the same as the first embodiment, except that a simple calculation is adopted to obtain a forwarding sub-period label. As shown in FIG. 4, a detailed process includes the following steps of S401, S402, S403 and S404.

At S401, a message sent by an upstream device is received, where the message carries first information for indicating an outbound interface and second information for indicating a period value.

S401 in this embodiment is substantially the same as S101 in the first embodiment, so the details will not be elaborated herein.

At S402, a reception sub-period label is acquired according to a time of arrival of the message and the second information.

S402 in this embodiment is substantially the same as S102 in the first embodiment, so the details will not be elaborated herein.

At S403, a forwarding sub-period label is calculated according to the reception sub-period label.

In this embodiment, the forwarding sub-period label is calculated by the following formula:

$$y=(x+i)\%m_n,$$

where y denotes the forwarding sub-period label, x denotes the reception sub-period label obtained by executing S402, i denotes a natural number preset according to an actual situation, $m_n$ denotes a quantity of reception sub-periods included in the reception period determined according to $T_n$, and $T_n$ denotes a period value determined according to the period information in S402.

At S404, the message is sent out from the outbound interface indicated by the first information in the forwarding sub-period indicated by the forwarding sub-period label.

In this embodiment, only a simple calculation may be needed to acquire the forwarding sub-period label and implement data forwarding, and acquisition and lookup of the local period mapping table are not required. By providing a simpler method to acquire the forwarding sub-period, the processing efficiency is improved and storage space is saved.

To enable those having ordinary skills in the art to more clearly understand the overall processes of the data transmission methods disclosed in the first to third embodiments of the present disclosure, fourth to sixth embodiments of the present disclosure are described using specific application scenarios as examples.

Figure 5:
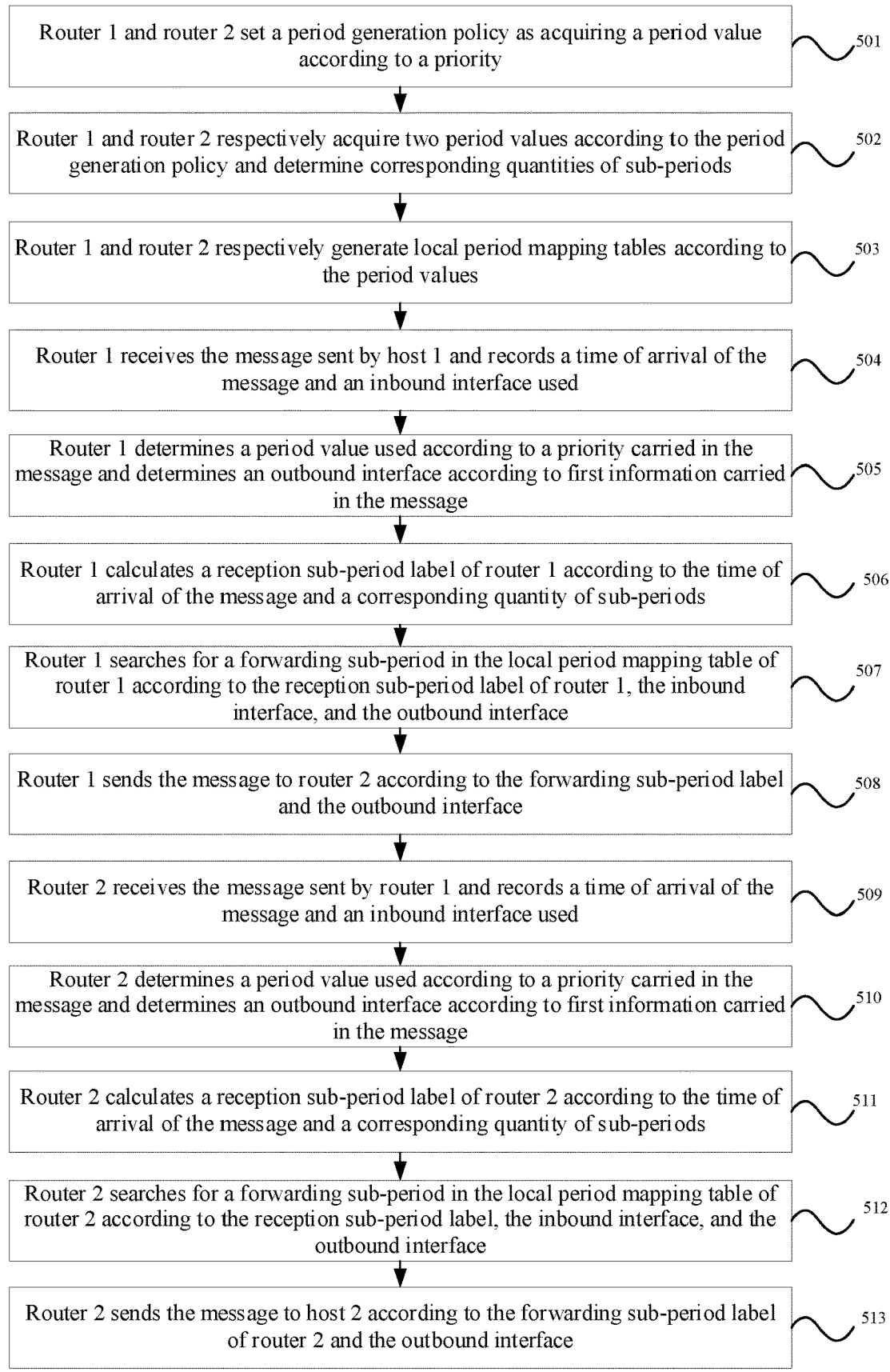
FIG. 5 is a flowchart of a data transmission method according to a fourth embodiment of the present disclosure.
Figure 6:
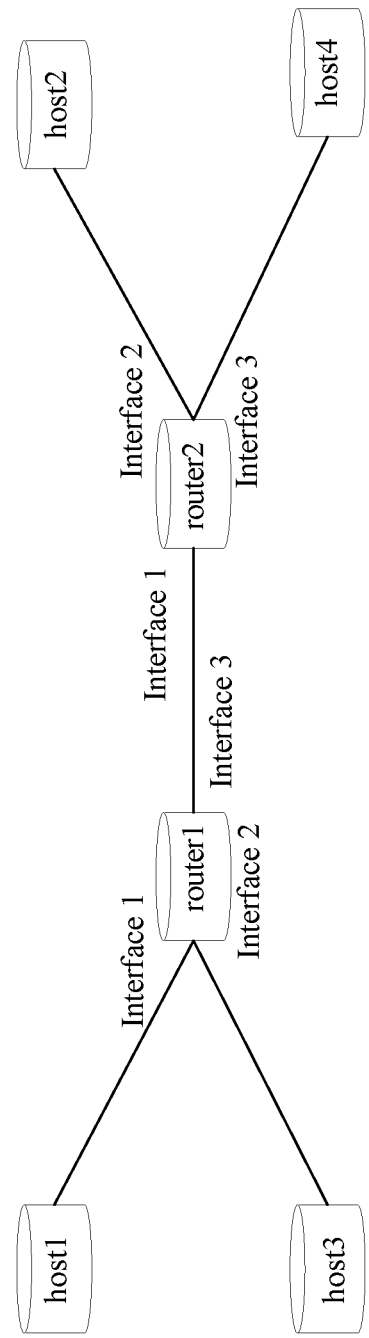
FIG. 6 shows an application scenario of a data transmission method according to a fourth embodiment of the present disclosure.

As shown in FIG. 5, a data transmission method provided by the fourth embodiment of the present disclosure is applied to a data transmission scenario shown in FIG. 6, and is described using an example where the second information has the priority. The method includes the following steps of S501, S502, S503, S504, S505, S506, S507, S508, S509, S510, S511, S512 and S513.

At S501, router 1 and router 2 set a period generation policy as acquiring a period value according to a priority.

At S502, router 1 and router 2 respectively acquire two period values according to the period generation policy and determine corresponding quantities of sub-periods.

In this embodiment, as shown in FIG. 6, there are two forwarding devices in the network, namely, router 1 and router 2, and four non-forwarding devices, namely, host 1, host 2, host 3, and host 4. Host 1 and host 3 are connected to interface 1 and interface 2 of router 1 respectively, and host 2 and host 4 are connected to interface 2 and interface 3 of router 2 respectively. It is assumed that host 1 is a source device of a stream 1 and has a priority of 2, host 2 is a destination device of the stream 1, and the message stream 1 sent by host 1 arrives at host 2 through router 1 and router 2. It is further assumed that host 3 is a source sender of a stream 2 and has a priority of 3, host 4 is a destination receiver of the stream 2, and the message stream 2 sent by host 3 arrives at host 4 through router 1 and router 2. Therefore, two period values are generated for priority 2 and priority 3 respectively: T1=10 μs and T2=20 μs. The quantity of periods corresponding to the period value of 10 μs is m1=12, and the quantity of periods corresponding to the period value of 20 μs is m2=6.

At S503, router 1 and router 2 respectively generate local period mapping tables according to the period values.

In this embodiment, the generated local period mapping tables of router 1 and router 2 are shown in the following tables.

TABLE 1

Period mapping table of router 1

| Period | Inbound interface | Inbound interface period number | Outbound interface | Outbound interface period number |
|---|---|---|---|---|
| 10 μs | Interface 1 | 0 | Interface 3 | 6 |
|  |  | 1 |  | 7 |
|  |  | 2 |  | 8 |
|  |  | 3 |  | 9 |
|  |  | 4 |  | 10 |
|  |  | 5 |  | 11 |
|  |  | 6 |  | 0 |
|  |  | 7 |  | 1 |
|  |  | 8 |  | 2 |
|  |  | 9 |  | 3 |
|  |  | 10 |  | 4 |
|  |  | 11 |  | 5 |
|  | Interface 2 | 0 | Interface 3 | 10 |
|  |  | 1 |  | 11 |
|  |  | 2 |  | 0 |
|  |  | 3 |  | 1 |
|  |  | 4 |  | 2 |
|  |  | 5 |  | 3 |
|  |  | 6 |  | 4 |
|  |  | 7 |  | 5 |
|  |  | 8 |  | 6 |
|  |  | 9 |  | 7 |
|  |  | 10 |  | 8 |
|  |  | 11 |  | 9 |
| 20 μs | Interface 1 | 0 | Interface 3 | 3 |
|  |  | 1 |  | 4 |
|  |  | 2 |  | 5 |
|  |  | 3 |  | 0 |
|  |  | 4 |  | 1 |
|  |  | 5 |  | 2 |
|  | Interface 2 | 0 | Interface 3 | 1 |
|  |  | 1 |  | 2 |
|  |  | 2 |  | 3 |
|  |  | 3 |  | 4 |
|  |  | 4 |  | 5 |
|  |  | 5 |  | 0 |

TABLE 2

Period mapping table of router 2

| Period | Inbound interface | Inbound interface period number | Outbound interface | Outbound interface period number |
|---|---|---|---|---|
| 10 μs | Interface 1 | 0 | Interface 2 | 3 |
|  |  | 1 |  | 4 |
|  |  | 2 |  | 5 |
|  |  | 3 |  | 6 |
|  |  | 4 |  | 7 |
|  |  | 5 |  | 8 |
|  |  | 6 |  | 9 |
|  |  | 7 |  | 10 |
|  |  | 8 |  | 11 |
|  |  | 9 |  | 0 |
|  |  | 10 |  | 1 |
|  |  | 11 |  | 2 |
|  | Interface 1 | 0 | Interface 3 | 7 |
|  |  | 1 |  | 8 |
|  |  | 2 |  | 9 |
|  |  | 3 |  | 10 |
|  |  | 4 |  | 11 |
|  |  | 5 |  | 0 |
|  |  | 6 |  | 1 |
|  |  | 7 |  | 2 |
|  |  | 8 |  | 3 |
|  |  | 9 |  | 4 |

TABLE 2-continued

Period mapping table of router 2

| Period | Inbound interface | Inbound interface period number | Outbound interface | Outbound interface period number |
|---|---|---|---|---|
| 20 μs | Interface 1 | 10 | Interface 2 | 5 |
| | | 11 | | 6 |
| | | 0 | | 1 |
| | | 1 | | 2 |
| | | 2 | | 3 |
| | | 3 | | 4 |
| | | 4 | | 5 |
| | | 5 | | 0 |
| | Interface 1 | 0 | Interface 3 | 4 |
| | | 1 | | 5 |
| | | 2 | | 0 |
| | | 3 | | 1 |
| | | 4 | | 2 |
| | | 5 | | 3 |

At S504, router 1 receives the message sent by host 1 and records a time of arrival of the message and an inbound interface used.

In this embodiment, host 1 sends the source message stream 1, and router 1 receives the message and records that a moment at which the message arrives at interface 1 of router 1 is 145 μs.

At S505, router 1 determines a period value used according to a priority carried in the message and determines an outbound interface according to first information carried in the message.

In this embodiment, if the priority carried in the message is 2, the period value used is 10 μs; and if the first information is an IP address of host 2, the outbound interface is interface 3 of router 1.

At S506, router 1 calculates a reception sub-period label of router 1 according to the time of arrival of the message and a corresponding quantity of sub-periods.

In this embodiment, if an initial moment of starting of router 1 is preset to 0 μs, the reception sub-period label of router 1 is:

$$x = \left\{ \left[ \frac{(145\ us - 0\ us)}{10\ us} \right] + 1 \right\} \% \ 12 = 3.$$

In this case, in this embodiment, the reception sub-period label of the message arriving at the inbound interface is 3.

At S507, router 1 searches for a forwarding sub-period in the local period mapping table of router 1 according to the reception sub-period label of router 1, the inbound interface, and the outbound interface.

In this embodiment, it is determined through steps S504 to S506 that the reception sub-period label is 3, the inbound interface is interface 1 of router 1, and the outbound interface is interface 3 of router 1. In this case, it can be learned by looking up Table 1 that the forwarding sub-period label is 9.

At S508, router 1 sends the message to router 2 according to the forwarding sub-period label and the outbound interface.

In this embodiment, router 1 sends the message to router 2 in the ninth forwarding sub-period through interface 3.

At S509, router 2 receives the message sent by router 1 and records a time of arrival of the message and an inbound interface used.

In this embodiment, router 2 receives the message sent by router 1 through interface 3 in the ninth sub-period in the period having the period value of 10 μs, and records a reception time of 185 μs and the used inbound interface which is interface 1 of router 2.

At S510, router 2 determines a period value used according to a priority carried in the message and determines an outbound interface according to first information carried in the message.

In this embodiment, if the priority carried in the message is 2, the period value to be used is 10 μs; and if the first information is the IP address of host 2, the outbound interface is interface 2 of router 2.

At S511, router 2 calculates a reception sub-period label of router 2 according to the time of arrival of the message and a corresponding quantity of sub-periods.

In this embodiment, if an initial moment of starting of router 2 is preset to 0 μs, the reception sub-period label of router 2 is:

$$x = \left\{ \left[ \frac{(185\ us - 0\ us)}{10\ us} \right] + 1 \right\} \% \ 12 = 7.$$

In this case, in this embodiment, a reception period label of the message arriving at interface 1 of router 2 is 3.

At S512, router 2 searches for a forwarding sub-period in the local period mapping table of router 2 according to the reception sub-period label, the inbound interface, and the outbound interface.

In this embodiment, it is determined through steps S509 to S511 that the reception sub-period label is 7, the inbound interface is interface 1 of router 2, and the outbound interface is interface 2 of router 2. In this case, it can be learned by looking up Table 2 that the forwarding sub-period label is 10.

At S513, router 2 sends the message to host 2 according to the forwarding sub-period label of router 2 and the outbound interface.

In this embodiment, router 2 sends the message to host 2 through interface 2 in the tenth forwarding sub-period, for host 2 to receive and use the message.

In the embodiment of the present disclosure, after a message without adding time period label information of the upstream device is received from the upstream device, a reception sub-period label is acquired according to a time of arrival of the message and a priority used for indicating a period value and carried in the message, and finally the message is directly sent out according to the reception sub-period label and a destination IP address used for indicating an outbound interface and carried in the message. Because time label information of the upstream device is not carried in the message, only the priority in the message and the time of arrival of the message may need to be extracted to calculate a reception sub-period of a current device to replace the time label information of the upstream device. Further, there may be no need to update the time label information due to a change of the upstream device before forwarding the time label information to a downstream device, so that data transmission can be implemented in an asynchronous mode without extending a protocol or modifying the message. In addition, because two period values can be generated according to an actual situation, mapping and forwarding in a multi-period scenario can be supported.

Figure 7:
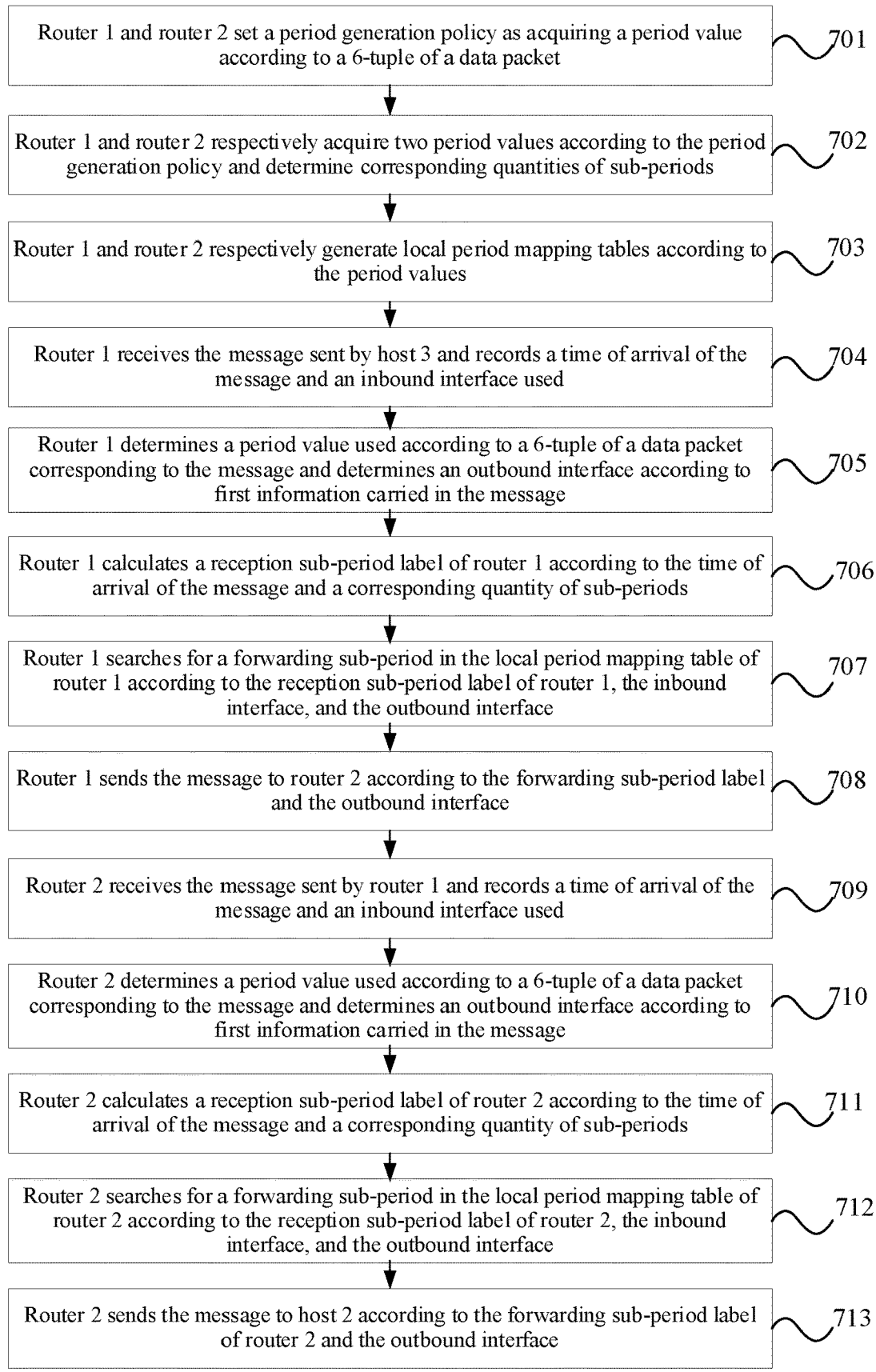
FIG. 7 is a flowchart of a data transmission method according to a fifth embodiment of the present disclosure.

The fifth embodiment of the present disclosure provides a data transmission method, which is applied to the application scenario shown in FIG. 6. As shown in FIG. 7, the second information is, for example, a 6-tuple of a data packet, and the method includes the following steps of S701, S702, S703, S704, S705, S706, S707, S708, S709, S710, S711, S712 and S713.

At S701, router 1 and router 2 set a period generation policy as acquiring a period value according to a 6-tuple of a data packet.

At S702, router 1 and router 2 respectively acquire two period values according to the period generation policy and determine corresponding quantities of sub-periods.

In this embodiment, as shown in FIG. 6, there are two forwarding devices in the network, namely, router 1 and router 2, and four non-forwarding devices, namely, host 1, host 2, host 3, and host 4. Host 1 and host 3 are connected to interface 1 and interface 2 of router 1 respectively, and host 2 and host 4 are connected to interface 2 and interface 3 of router 2 respectively. It is assumed that host 1 is a source device of a stream 1 and has a priority of 2, host 2 is a destination device of the stream 1, and the message stream 1 sent by host 1 arrives at host 2 through router 1 and router 2. It is further assumed that host 3 is a source sender of a stream 2 and has a priority of 3, host 4 is a destination receiver of the stream 2, and the message stream 2 sent by host 3 arrives at host 4 through router 1 and router 2. Therefore, corresponding periods 20 μs and 40 μs are generated for a 6-tuple of stream 1 and a 6-tuple of stream 2 respectively. The quantity of periods corresponding to the period value of 20 μs is m1=4, and the quantity of periods corresponding to the period value of 40 μs is m2=2.

At S703, router 1 and router 2 respectively generate local period mapping tables according to the period values.

In this embodiment, the generated local period mapping tables of router 1 and router 2 are shown in the following tables.

TABLE 3

Period mapping table of router 1

| Period | Inbound interface | Inbound interface period number | Outbound interface | Outbound interface period number |
|---|---|---|---|---|
| 20 μs | Interface 1 | 0 | Interface 3 | 3 |
|  |  | 1 |  | 0 |
|  |  | 2 |  | 1 |
|  |  | 3 |  | 2 |
|  | Interface 2 | 0 | Interface 3 | 1 |
|  |  | 1 |  | 2 |
|  |  | 2 |  | 3 |
|  |  | 3 |  | 0 |
| 40 μs | Interface 1 | 0 | Interface 3 | 0 |
|  |  | 1 |  | 1 |
|  | Interface 2 | 0 | Interface 3 | 1 |
|  |  | 1 |  | 0 |

TABLE 4

Period mapping table of router 2

| Period | Inbound interface | Inbound interface period number | Outbound interface | Outbound interface period number |
|---|---|---|---|---|
| 20 μs | Interface 1 | 0 | Interface 2 | 2 |
|  |  | 1 |  | 3 |
|  |  | 2 |  | 0 |
|  |  | 3 |  | 1 |
|  | Interface 1 | 0 | Interface 3 | 3 |
|  |  | 1 |  | 0 |

TABLE 4-continued

Period mapping table of router 2

| Period | Inbound interface | Inbound interface period number | Outbound interface | Outbound interface period number |
|---|---|---|---|---|
|  |  | 2 |  | 1 |
|  |  | 3 |  | 2 |
| 40 μs | Interface 1 | 0 | Interface 2 | 1 |
|  |  | 1 |  | 0 |
|  | Interface 1 | 0 | Interface 3 | 1 |
|  |  | 1 |  | 0 |

At S704, router 1 receives the message sent by host 3 and records a time of arrival of the message and an inbound interface used.

In this embodiment, host 3 sends the source message stream 2, and router 1 receives the message and records that a moment at which the message arrives at interface 2 of router 1 is 1045 μs.

At S705, router 1 determines a period value used according to a 6-tuple of a data packet corresponding to the message and determines an outbound interface according to first information carried in the message.

In this embodiment, if the used period value determined according to the 6-tuple of the data packet corresponding to the message is 40 μs, and the first information is an IP address of host 4, the outbound interface is interface 3 of router 1.

At S706, router 1 calculates a reception sub-period label of router 1 according to the time of arrival of the message and a corresponding quantity of sub-periods.

In this embodiment, if an initial moment of starting of router 1 is preset to 1000 μs, the reception sub-period label of router 1 is:

$$x = \left\{\left[\frac{(1045 \ us - 1000 \ us)}{40 \ us}\right] + 1\right\} \% \ 2 = 0.$$

In this case, in this embodiment, the reception sub-period label of the message arriving at the inbound interface is 3.

At S707, router 1 searches for a forwarding sub-period in the local period mapping table of router 1 according to the reception sub-period label of router 1, the inbound interface, and the outbound interface.

In this embodiment, it is determined through steps S704 to S706 that the local sub-period label is 0, the inbound interface is interface 2 of router 1, and the outbound interface is interface 3 of router 1. In this case, it can be learned by looking up Table 3 that the forwarding sub-period label is 1.

At S708, router 1 sends the message to router 2 according to the forwarding sub-period label and the outbound interface.

In this embodiment, router 1 sends the message to router 2 in the third forwarding sub-period through interface 3.

At S709, router 2 receives the message sent by router 1 and records a time of arrival of the message and an inbound interface used.

In this embodiment, router 2 receives the message sent by router 1 through interface 3 in the third sub-period in the period having the period value of 10 μs, and records a reception time of 1125 μs and the used inbound interface which is interface 1 of router 2.

At S710, router 2 determines a period value used according to a 6-tuple of a data packet corresponding to the message and determines an outbound interface according to first information carried in the message.

In this embodiment, if the used period value determined according to the 6-tuple of the data packet corresponding to the message is 40 μs, and the first information is the IP address of host 4, the outbound interface is interface 3 of router 2.

At S711, router 2 calculates a reception sub-period label of router 2 according to the time of arrival of the message and a corresponding quantity of sub-periods.

In this embodiment, if an initial moment of starting of router 2 is preset to 1000 μs, the reception sub-period label of router 2 is:

$$x = \left\{ \left[ \frac{(1125\ us - 1000\ us)}{40\ us} \right] + 1 \right\} \% \ 2 = 0.$$

In this case, in this embodiment, the reception sub-period label of the message arriving at the inbound interface is 0.

At S712, router 2 searches for a forwarding sub-period in the local period mapping table of router 2 according to the reception sub-period label of router 2, the inbound interface, and the outbound interface.

In this embodiment, it is determined through steps S709 to S711 that the local sub-period label is 0, the inbound interface is interface 1 of router 2, and the outbound interface is interface 3 of router 2. In this case, it can be learned by looking up Table 2 that the forwarding sub-period label is 1.

At S713, router 2 sends the message to host 2 according to the forwarding sub-period label of router 2 and the outbound interface.

In this embodiment, router 2 sends the message to host 4 through outbound interface 3 in the first forwarding sub-period, for host 4 to receive and use the message.

In the embodiment of the present disclosure, after a message without adding time period label information of the upstream device is received from the upstream device, a reception sub-period label is acquired according to a time of arrival of the message and a 6-tuple of a data packet used for indicating a period value and carried in the message, and finally the message is directly sent out according to the reception sub-period label and a destination IP address used for indicating an outbound interface and carried in the message. Because time label information of the upstream device is not carried in the message, only the priority in the message and the time of arrival of the message may need to be extracted to calculate a reception sub-period of a current device to replace the time label information of the upstream device. Further, there may be no need to update the time label information due to a change of the upstream device before forwarding the time label information to a downstream device, so that data transmission can be implemented in an asynchronous mode without extending a protocol or modifying the message. In addition, because two period values can be generated according to an actual situation, mapping and forwarding in a multi-period scenario can be supported.

Figure 8:
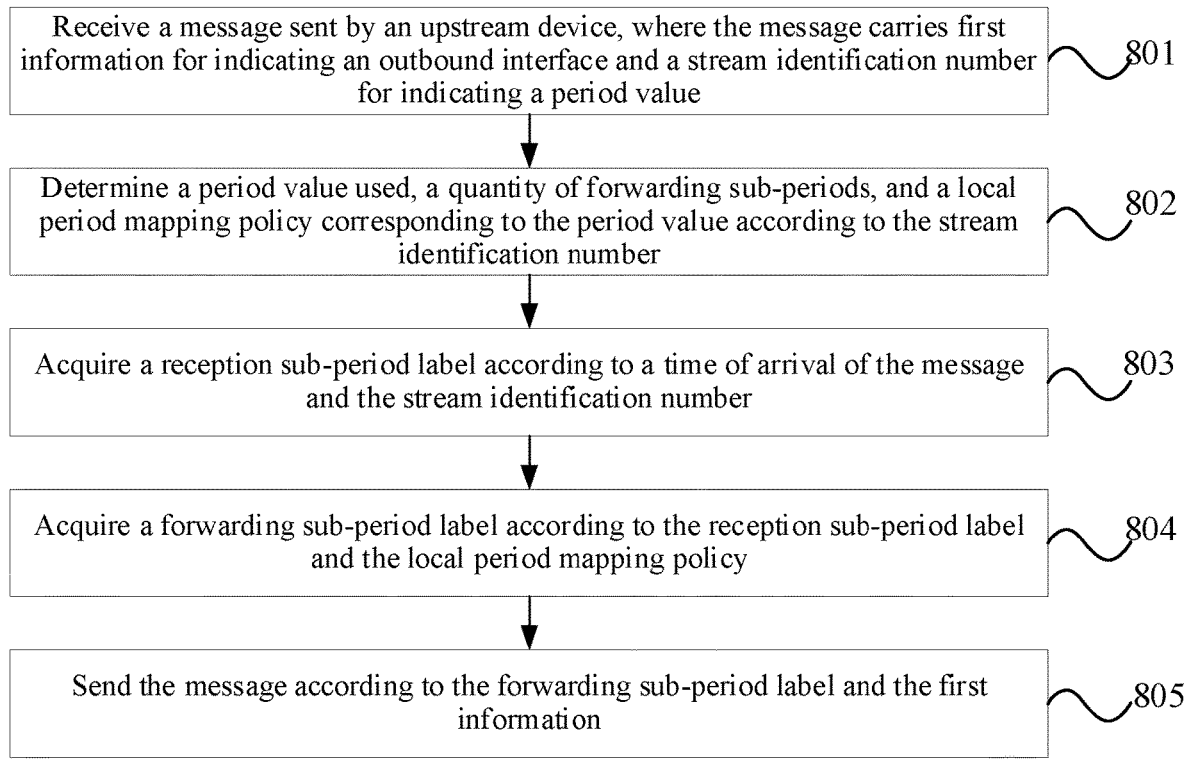
FIG. 8 is a flowchart of a data transmission method according to a sixth embodiment of the present disclosure.

As shown in FIG. 8, a data transmission method provided by the sixth embodiment of the present disclosure is described using an example where the second information is a stream identification number. The method includes the following steps of S801, S802, S803, S804 and S805.

At S801, a message sent by an upstream device is received, where the message carries first information for indicating an outbound interface and a stream identification number for indicating a period value In this embodiment, the stream identification number carried in the message is 3.

At S802, a period value used, a quantity of forwarding sub-periods, and a local period mapping policy corresponding to the period value are determined according to the stream identification number.

In this embodiment, the period value corresponding to the stream identification number of 3 obtained by executing S801 is 25 μs, the quantity of forwarding sub-periods is 8, and the local period mapping policy is y=(x+1) % 8, where y denotes the forwarding sub-period label, and x denotes the local sub-period label.

It should be noted that the local period mapping policy is a mapping relationship stored in the device in advance. For example, when the period value between the inbound interface 1 and the outbound interface 2 is 25 μs, and the quantity of period numbers is 8, the period mapping formula is y=(x+1) % 8. When the period value between the inbound interface 1 and the outbound interface 3 is 30 μs, and the quantity of period numbers is 6, the period mapping formula is y=(x+2) % 6. The corresponding specific mapping relationship can be acquired according to the determined period. Certainly, the above is only an example. In practice, the local period mapping policy may further include other mapping relationships, which will not be elaborated herein.

At S803, a reception sub-period label is acquired according to a time of arrival of the message and the stream identification number.

In this embodiment, assuming that the time of arrival is 98 μs, the local sub-period label can be obtained according to the data acquired in the above steps as follows:

$$x = \left\{ \left[ \frac{(98\ us - 40\ us)}{25\ us} \right] + 1 \right\} \% \ 8 = 2,$$

i.e., a local period label of the message arriving at the inbound interface is 2.

At S804, a forwarding sub-period label is acquired according to the reception sub-period label and the local period mapping policy.

In this embodiment, the forwarding sub-period label is: y=(2+1) % 8=3.

At S805, the message is sent according to the forwarding sub-period label and the first information.

In this embodiment, the message is sent out through the outbound interface indicated by the first information in the third forwarding sub-period.

In this embodiment, because data forwarding can be implemented through only a simple calculation without having to acquire the local period mapping table, storage space is saved, making the method simpler.

In addition, it should be understood that the division of the steps of the above methods is only for the sake of clear description, and in practical applications, the steps may be combined into one step, or some steps may be further divided into multiple steps. Such combination or division falls within the scope of protection of the present disclosure as long as the same logical relationship is included. Any insignificant modification made to or any insignificant design introduced in an algorithm or process without changing the core design of the algorithm and process shall fall within the scope of protection of the present disclosure.

Figure 9:
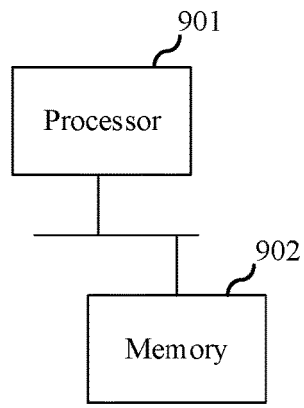
FIG. 9 is a schematic structural diagram of an electronic device according to a seventh embodiment of the present disclosure.

A seventh embodiment of the present disclosure relates to an electronic device. As shown in FIG. 9, the electronic device includes: at least one processor 901; and a memory 902 communicably connected to the at least one processor 901. The memory 902 stores instructions executable by the at least one processor 901 which, when executed by the at least one processor 901, causes the at least one processor 901 to implement the data transmission method according to any one of the foregoing method embodiments.

The memory 902 and the processor 901 are connected by a bus. The bus may include any number of interconnected buses and bridges. The bus connects various circuits of one or more processors 901 and the memory 902 together. The bus may also connect together a peripheral device, a voltage regulator, a power management circuit, and other circuits, which are well known in the art and therefore will not be detailed herein. A bus interface provides an interface between the bus and a transceiver. The transceiver may be one element or a plurality of elements, for example, a plurality of receivers and transmitters, and provides a unit for communicating with various other apparatus over a transmission medium. Data processed by the processor 901 is transmitted over a wireless medium through an antenna. The antenna further receives data and transmits the data to the processor 901.

The processor 901 is configured for managing the bus and general processing and may also provide various functions, including timing, peripheral interfaces, voltage regulation, power management and other control functions. The memory 902 may be configured to store data used by the processor 901 in performing operations.

An eighth embodiment of the present disclosure relates to a computer-readable storage medium, storing a computer program. The computer program, when executed by a processor, causes the processor to implement the foregoing method embodiments.

It may be understood by those having ordinary skills in the art that all or some of the steps of the methods in the above embodiments may be performed by a program instructing related hardware. The program is stored in a storage medium, and includes several instructions to cause a device (which may be a single chip microcomputer, a chip, etc.) or a processor to perform all or some of the steps of the methods described in the embodiments of the present disclosure. The foregoing storage medium includes any medium that can store program code, such as a USB flash drive, a removable hard disk, a Read-Only Memory (ROM), a Random Access Memory (RAM), a magnetic disk, or an optical disk.

It may be understood by those having ordinary skills in the art that the foregoing embodiments are specific embodiments for practicing the present disclosure and that in practical applications, various changes in form and details may be made without departing from the scope of the present disclosure.

What is claimed is:

1. A data transmission method, comprising:
    receiving a message sent by an upstream device, wherein the message carries first information for indicating an outbound interface and second information for indicating a period value;
    acquiring a reception sub-period label according to a time of arrival of the message and the second information, wherein the reception sub-period label is used for indicating a sequential position of a reception sub-period used when the message is received in an entire reception period, and the reception period comprises a plurality of reception sub-periods; and
    sending the message according to the reception sub-period label and the first information.

2. The data transmission method of claim 1, wherein prior to receiving a message sent by an upstream device, the method further comprises:
    setting a period generation policy;
    acquiring at least one period value according to the period generation policy; and
    generating and storing a local period mapping table according to the period value.

3. The data transmission method of claim 2, wherein sending the message according to the reception sub-period label and the first information comprises:
    recording an inbound interface used when the message arrives;
    determining the outbound interface according to the first information;
    searching for a forwarding sub-period label in the local period mapping table according to the reception sub-period label, the inbound interface, and the outbound interface,
        wherein the forwarding sub-period label is used for indicating a sequential position of a forwarding sub-period used when the message is forwarded in an entire forwarding period, and
        the forwarding period comprises a plurality of forwarding sub-periods; and
    sending the message out from the outbound interface in the forwarding sub-period indicated by the forwarding sub-period label.

4. The data transmission method of claim 2, wherein the period generation policy is to acquire the period value according to the second information, and
    the second information is a stream identification number or a 6-tuple of a data packet or a priority.

5. The data transmission method of claim 2, wherein sending the message according to the reception sub-period label and the first information comprises:
    calculating the forwarding sub-period label according to the reception sub-period label; and
    sending the message out from the outbound interface indicated by the first information in the forwarding sub-period indicated by the forwarding sub-period label.

6. The data transmission method of claim 2, wherein acquiring a reception sub-period label according to a time of arrival of the message and the second information comprises:
    determining the period value corresponding to the message according to the second information; and
    calculating the reception sub-period label according to the period value and the time of arrival.

7. The data transmission method of claim 1, wherein sending the message according to the reception sub-period label and the first information comprises:
    recording an inbound interface used when the message arrives;
    determining the outbound interface according to the first information;
    searching for a forwarding sub-period label in the local period mapping table according to the reception sub-period label, the inbound interface, and the outbound interface, wherein the forwarding sub-period label is used for indicating a sequential position of a forwarding sub-period used when the message is forwarded in an entire forwarding period, and the forwarding period comprises a plurality of forwarding sub-periods; and sending the message out from the outbound interface in the forwarding sub-period indicated by the forwarding sub-period label.

8. The data transmission method of claim 7, wherein the period generation policy is to acquire the period value according to the second information, and the second information is a stream identification number or a 6-tuple of a data packet or a priority.

9. The data transmission method of claim 7, wherein sending the message according to the reception sub-period label and the first information comprises:

calculating the forwarding sub-period label according to the reception sub-period label; and sending the message out from the outbound interface indicated by the first information in the forwarding sub-period indicated by the forwarding sub-period label.

10. The data transmission method of claim 7, wherein acquiring a reception sub-period label according to a time of arrival of the message and the second information comprises:

determining the period value corresponding to the message according to the second information; and calculating the reception sub-period label according to the period value and the time of arrival.

11. The data transmission method of claim 1, wherein the period generation policy is to acquire the period value according to the second information, and the second information is a stream identification number or a 6-tuple of a data packet or a priority.

12. The data transmission method of claim 11, wherein sending the message according to the reception sub-period label and the first information comprises:

calculating the forwarding sub-period label according to the reception sub-period label; and sending the message out from the outbound interface indicated by the first information in the forwarding sub-period indicated by the forwarding sub-period label.

13. The data transmission method of claim 11, wherein acquiring a reception sub-period label according to a time of arrival of the message and the second information comprises:

determining the period value corresponding to the message according to the second information; and calculating the reception sub-period label according to the period value and the time of arrival.

14. The data transmission method of claim 1, wherein sending the message according to the reception sub-period label and the first information comprises:

calculating the forwarding sub-period label according to the reception sub-period label; and sending the message out from the outbound interface indicated by the first information in the forwarding sub-period indicated by the forwarding sub-period label.

15. The data transmission method of claim 14, wherein calculating the forwarding sub-period label according to the reception sub-period label is implemented based on the following formula:

$$y=(x+i)\%m_n,$$

where, y denotes the forwarding sub-period label, x denotes the reception sub-period label, i denotes a preset natural number, $m_n$ denotes a quantity of forwarding sub-periods comprised in the forwarding period determined according to $T_n$, $T_n$ denotes the period value corresponding to the forwarding sub-period, and % denotes a remainder sign.

16. The data transmission method of claim 1, wherein acquiring a reception sub-period label according to a time of arrival of the message and the second information comprises:

determining the period value corresponding to the message according to the second information; and calculating the reception sub-period label according to the period value and the time of arrival.

17. The data transmission method of claim 16, wherein calculating the reception sub-period label according to the period value and the time of arrival is implemented based on the following formula:

$$x = \left\{ \left[ \frac{t_{arrive} - t_{start}}{T_n} \right] + 1 \right\} \% \ m_n,$$

where x denotes the reception sub-period label, $t_{start}$ denotes a preset value, $t_{arrive}$ denotes the time of arrival, $T_n$ denotes the period value, $m_n$ denotes a quantity of reception sub-periods comprised in the reception period determined according to $T_n$,

[ ] in the formula denotes a rounding sign, and

% denotes a remainder sign.

18. The data transmission method of claim 14, wherein acquiring a reception sub-period label according to a time of arrival of the message and the second information comprises:

determining the period value corresponding to the message according to the second information; and calculating the reception sub-period label according to the period value and the time of arrival.

19. An electronic device, comprising:

at least one processor; and a memory communicably connected to the at least one processor, wherein:

the memory stores instructions executable by the at least one processor which, when executed by the at least one processor, causes the at least one processor to perform a data transmission method, comprising:

receiving a message sent by an upstream device, wherein the message carries first information for indicating an outbound interface and second information for indicating a period value;

acquiring a reception sub-period label according to a time of arrival of the message and the second information, wherein the reception sub-period label is used for indicating a sequential position of a reception sub-period used when the message is received in an entire reception period, and the reception period comprises a plurality of reception sub-periods; and sending the message according to the reception sub-period label and the first information.

20. A non-transitory computer-readable storage medium, storing a computer program which, when executed by a processor, causes the processor to perform a data transmission method, comprising:

receiving a message sent by an upstream device, wherein the message carries first information for indicating an outbound interface and second information for indicating a period value;

acquiring a reception sub-period label according to a time of arrival of the message and the second information, wherein the reception sub-period label is used for indicating a sequential position of a reception sub-period used when the message is received in an entire reception period, and the reception period comprises a plurality of reception sub-periods; and sending the message according to the reception sub-period label and the first information.

* * * * *